United States Patent [19]
Taylor

[11] 3,968,576
[45] July 13, 1976

[54] METHOD AND APPARATUS OF AURAL/VISUAL CORRESPONDENCE FOR THE IMPROVEMENT OF READING

[76] Inventor: Stanford E. Taylor, Hawk Drive, Lloyd Harbor, N.Y. 11743

[22] Filed: Sept. 2, 1975

[21] Appl. No.: 609,619

Related U.S. Application Data

[63] Continuation-in-part of Ser. No. 599,117, July 25, 1975, abandoned, which is a continuation of Ser. No. 423,271, Dec. 10, 1973, abandoned.

[52] U.S. Cl. .............................................. 35/35 B
[51] Int. Cl.² ....................................... G09B 17/04
[58] Field of Search ................. 35/35 B, 35 C, 8 A; 40/28.3; 179/15.55

[56] References Cited
UNITED STATES PATENTS

| | | | |
|---|---|---|---|
| 2,410,237 | 10/1946 | Renshaw ......................... | 35/35 B X |
| 2,950,543 | 8/1960 | Ritter et al. ....................... | 35/35 C |
| 2,975,672 | 3/1961 | Shields ............................ | 35/35 C X |
| 3,220,126 | 11/1965 | Gabrielsen ........................ | 35/8 A X |
| 3,481,052 | 12/1969 | Dorsett ............................. | 35/8 A |
| 3,531,575 | 9/1970 | Kobler et al. ..................... | 35/35 C |
| 3,541,266 | 11/1970 | Klayman et al. .............. | 179/15.55 R |
| 3,703,774 | 11/1972 | Goshima ........................... | 35/35 C |

Primary Examiner—William H. Grieb
Attorney, Agent, or Firm—Kane, Dalsimer, Kane, Sullivan and Kurucz

[57] ABSTRACT

A method and apparatus for aural and visual program correspondence for the improvement of reading by training the reader. A visual program is presented in line-by-line sequence with each line being held in position during a predetermined viewing time and a single line being observable during the predetermined viewing time. An aural program including spaced signals thereon is coordinated with the visual program so that pulses on the aural program advance the visual program in coordination and in a manner that maintains a constant rate of presentation of the aural and visual programs. The presentation of the aural and visual line-by-line programs are offset in time sequence but not to the degree that would affect the coordination of both aural and visual and as a result the reader is provided with a conditioning bimodal reading improvement experience.

5 Claims, 6 Drawing Figures

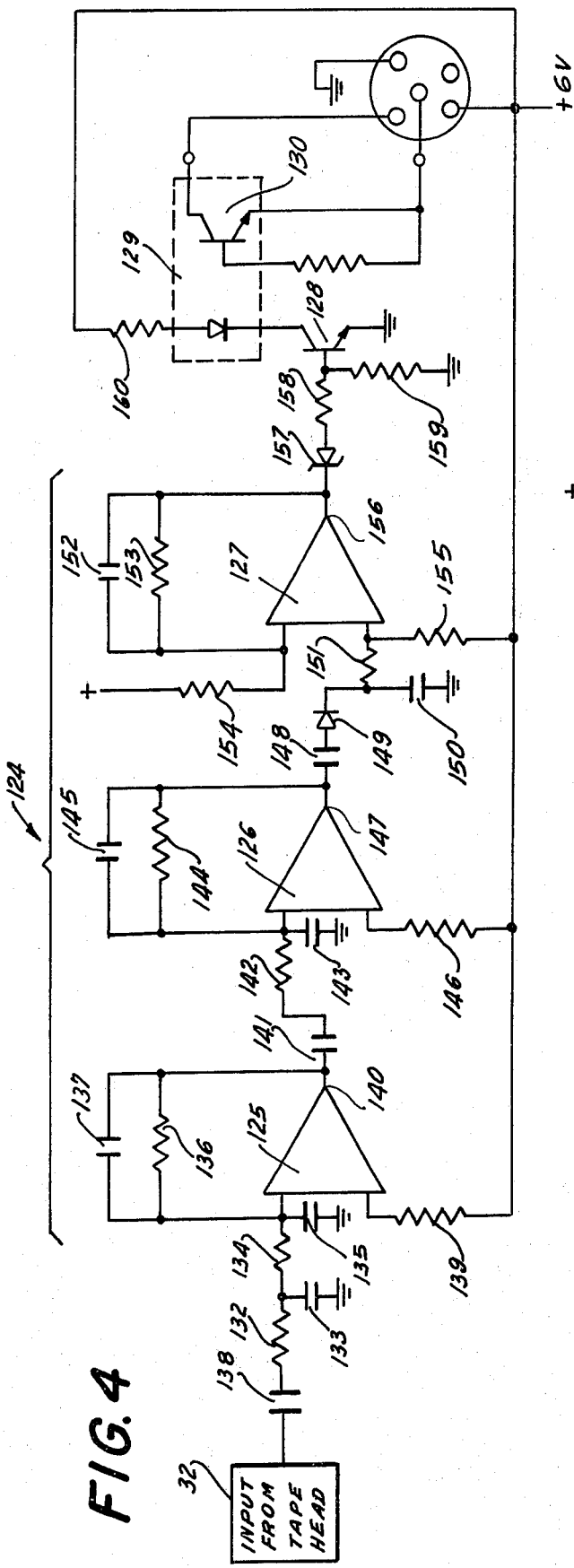
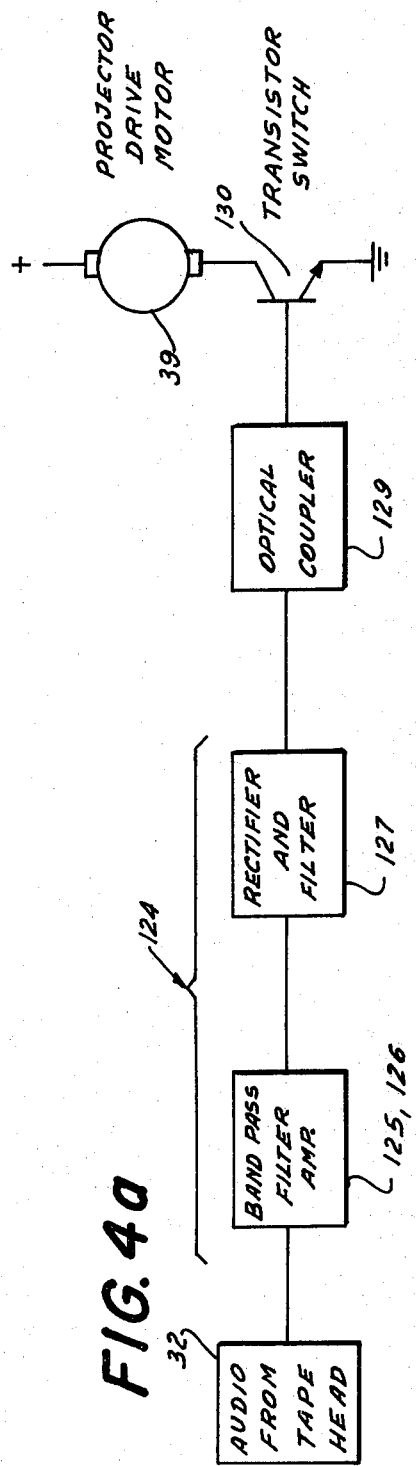
FIG. 4
FIG. 4a

METHOD AND APPARATUS OF AURAL/VISUAL CORRESPONDENCE FOR THE IMPROVEMENT OF READING

CROSS REFERENCE TO RELATED APPLICATIONS

This application is a continuation in part of my previously filed application Ser. No. 599,117 filed July 25, 1975 now abandoned which is a continuation of my previously filed application Ser. No. 423,271 filed Dec. 10, 1973, now abandoned.

BACKGROUND OF THE INVENTION

In the complex world of coordination of visual and audio programs for pleasure or for teaching purposes, there are many well known systems. For example, read along while listening techniques are commonly available as a means of helping learners make a more successful transition from an auditory orientation centered largely around listening, to a visual orientation involving the printed word. Systems of this type largely involve recorded narrations and the use of books or similar printed materials. As can be readily appreciated, there is very little grapheme-phoneme correspondence possible with such loosely coordinated and synchronized presentations. While most of this type of aural presentation is recorded at a single predetermined rate, some experimental work has employed variable rate speech means in conjunction with the reading of book or printed materials. None, however, use technological means to project or expose, by means of a viewer, print line by line in conjunction with a variable speed narration or a constant speed narration for that matter. This degree of visual control implicit in projection, or through the use of a viewer in coordination with different aural/visual rates of presentation can both direct and encourage a learner to engage in various forms of linguistic analysis and appreciation, thus helping the learner to become a more successful silent reader, and this type of system will constitute a unique system in regard to instructional technology as well as reading methodology. In summary, what is lacking in the known art is a means and method by which line by line projections of print are presented in correspondence with a narration to assist students learning any new language, whether their own native language in printed form or other foreign or secondary languages, better realize the relationship between the printed and the spoken word, or phrase in the case of shorthand, or any other similar symbol/sound relationship. A further desirable advancement of this method is the use of a simultaneously variable aural-visual presentation rate in order to stimulate and encourage a learner to engage in various forms of linguistic analysis and appreciation.

SUMMARY OF THE INVENTION

It is among the primary objectives of the present invention to provide a desired improved system as outlined above. The apparatus and method is designed to provide a unique form of bimodal instruction to be utilized in the stimulation and encouragement of a learner to engage in various forms of linguistic analysis and appreciation, the end result being improved reading performance.

Coordinated and equivalent aural and visual materials are presented to a reader/listener. The rate of both aural and visual are constant one to the other, but the aural phonemic sequence is delayed by a predetermined interval of time, approximately one second behind the presentation of the equivalent and corresponding graphic sequence.

The aural message is delayed behind the visual by virtue of a signal on the tape that transports into view new visual content while the aural message is still pronouncing the line of print just displaced. In this way the aural and visual presentations are coordinated, being reasonably close in time of presentation one to the other, but displaced somewhat to permit the visual message to be dealt with in advance of the aural under most training situations.

The rates of both aural and visual can be increased or decreased, and while both aural and visual are constant one to the other, at all rates, the reader/listener's reaction will vary, responding differently to the visual and aural presentations as a consequence of the reader/listeners' reading rate and proficiency.

Being able to control simultaneously the visual and aural presentations permits a conditioning bimodal experience that can assist all students to become more efficient readers.

For example, where it is desirable to encourage a viewer/listener to attend to individual words or word parts of a larger linguistics segment in order that he be assisted with word recognition and phrase realization, a rate of presentation that is appreciably slower than the learner's usual speaking/listening rate as well as reading rate would be employed. Under this condition, the viewer/listener with a surplus of visual inspection time in conjunction with a rate of aural input that is quite easily apprehended is encouraged to employ his surplus perception time attending to the more minute and discrete correlations of the aural/visual presentation.

If, on the other hand, the learner is to be encouraged to read more rapidly and fluently and to attend to sentences or larger linguistic units or to appreciate more completely the rhythm or the expression of the language, more rapid rates of aural/visual presentation would be employed. In essence, as the aural/visual presentation rate is increased, the learner is encouraged to attend to larger and more encompassing linguistic considerations, visually and auditorily. With perception time shortened, a viewer/listener must react more globally and comprehensively.

Within these general patterns of reaction, the exact manner in which the listener/viewer responds to this form of bimodal communication is dependent on his usual speaking, listening, and reading rates. In any bimodal learning situation of this sort, one mode of communication input will be attended to in a dominant manner and will provide most of the instructional stimuli and the other input mode will be subordinate and provide supportive stimuli.

If the aural/visual presentation rate is lower than the learner's usual reading rate and well within the range of auditory input he can accommodate to, the tendency will be for the learner to alternate attention to both the auditory and visual messages. Since the reader is restrained from performing visually as he usually would in visual reading, he tends to execute more eye stops or fixations per line as he views each projected line of print. This delay or restraint provides a surplus or perception time both visually and auditorily and as a consequence, the learner finds that he can perform intersensory perceptual shifts back and forth from one mode of input to the other, at times attending to the visual dominantly with the aural being supportive and vice versa. This practice in intersensory perceptual shifting increases a learner's ability to transfer attention rapidly from one modal source of input to another and this capability increases the potential for awareness of grapheme/phoneme relationships.

As the presentation rate is increased, the learner will tend to select as dominant that mode of communication that proves to be most successful and utilize the less successful mode as subordinate or supportive. For example, if the rate is higher than can be accommodated to in reading yet is acceptable aurally, then the aural mode will prove dominant and the visual subdominant and supportive. If however, a presentation rate approximates a learner's visual reading rate and this rate is within the range that is acceptable auditorially, either the visual or the aural mode can be dominant, depending on the choice and control of the learner and the directions of the learning task. And, if the presentation rate is acceptable visually but exceeds a learner's usual listening and speaking rate, then the learner will attend to the visual mode dominantly and use the aural as supportive.

Within the range of these predictable reactions to the various rate presentations of bimodal instructions, a beginning reader will first utilize such aural/visual instruction to assist him to realize the more minute grapheme/phoneme relationships that exist between speech and print and then later, when desirous of making the transition from an auditory orientation to more effective silent reading, would employ rates initially very close to usual reading rates and then increase these rates progressively. During this practice, the learner would consciously apply himself to the visual mode dominantly, utilizing the auditory as reinforcing. Then, as rates progress to higher levels, a student would naturally find it easier for the visual mode to remain dominant and the auditory mode reinforcing. Gradually, the dependence on the auditory for reinforcement would diminish. Word recognition and grapheme/phoneme reinforcement would become negligible and aural reinforcement would be in the nature of a greater appreciation of the delivery of the speech model and the expression, rhythm and cadence of the language.

In summary, varying the rate of bimodal presentation can provide learners with varied listening/reading capabilities with varied forms of aural/visual instruction and guidance that will improve reading abilities. Learners can be encouraged to cope with word recognition more competently, better realize grapheme/phoneme relationships, and realize that print is speech in visual form. Other learners who need to develop higher levels of fluency in reading can self-select or be assigned presentation rates close to reading rates and then, progressively higher rates to assist them in their transition from an auditory orientation to the visual orientation that accompanies fluent silent reading.

The presently disclosed method and apparatus, technically, accomplish the above discussed aural/visual presentation by the use of a variable speed audio program which is coordinated with a visual program.

In general, a method of aural and visual correspondence for the improvement of reading is provided. The method includes projecting a visual program in line-by-line sequence. Additionally, an aural program is transmitted in the form corresponding to the visual program and includes signals to advance the visual program in a predetermined pattern in coordination with the audio program. The audio and visual programs are presented at a constant rate but are arranged to be presented slightly out of time sequence one to the other but still in coordination to one another thereby providing the reader with the desired conditioning bimodal experience.

The apparatus for carrying out the present method includes means for holding the visual program and advancing and projecting or exposing the program in a line-by-line sequence in response to a predetermined signal. The aural program corresponds to the visual program and includes space signals thereon for advancing the visual program. Means are provided for holding, advancing and transmitting the aural program at a predetermined rate so that the signals thereon advance the visual program in line-by-line sequence in correspondence with the aural program. Means are provided to permit the aural and visual programs to be presented slightly out of sequence while still retained at a constant rate of presentation to thereby provide the reader with a desirable conditioning bimodal experience. Finally, means are provided for holding the visual program, advancing and projecting or exposing the program in line-by-line sequence in response to a predetermined signal.

With the above objectives, among others, in mind, reference is had to the attached drawings.

BRIEF DESCRIPTION OF THE DRAWINGS

In the drawings:

FIG. 4 is a schematic view of the circuitry employed in the audio portion of the aural/visual system of the invention;

FIG. 4a is a block diagram of the circuitry employed in the audio portion of the aural/visual system of the invention.

DESCRIPTION OF THE PREFERRED EMBODIMENTS

Figure 1:
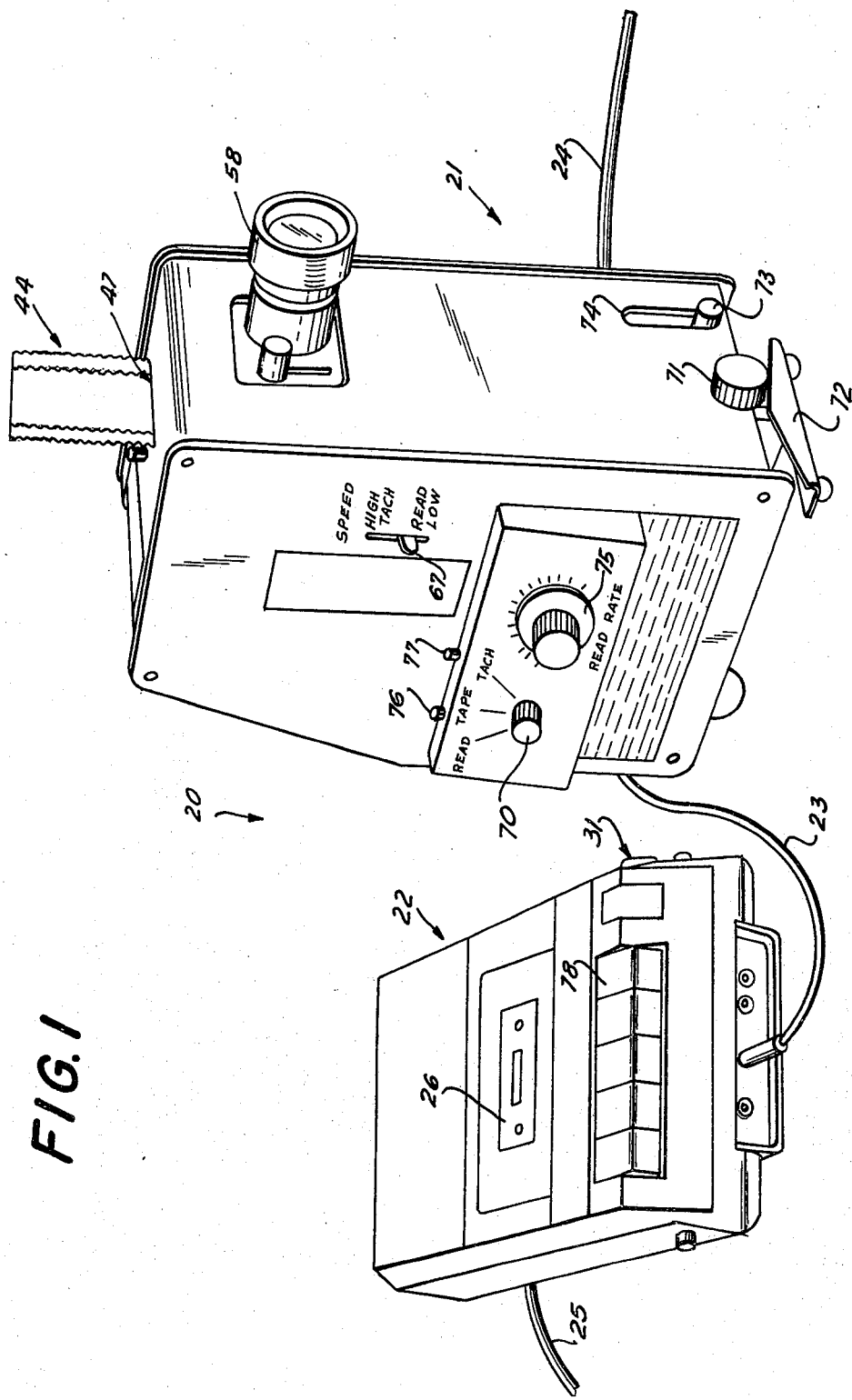
FIG. 1 is a perspective view of the aural/visual system of the invention.

As shown in FIG. 1, the aural/visual system 20 includes basically two interconnected subsystems. The first is the projector 21 for the visual presentation and the other is the tape player 22 for the audio portion. Tape player 22 is connected to projector 21 by means of connector 23. Connector 24 connects projector 21 to a conventional power source and similarly, connector 25 connects tape player 22 to a conventional power source.

Tape player 22 is designed to receive a cassette 26 containing an audio program along with a sequence of signals for use in activating the projector in a predetermined fashion to control the visual presentation.

Figure 2:
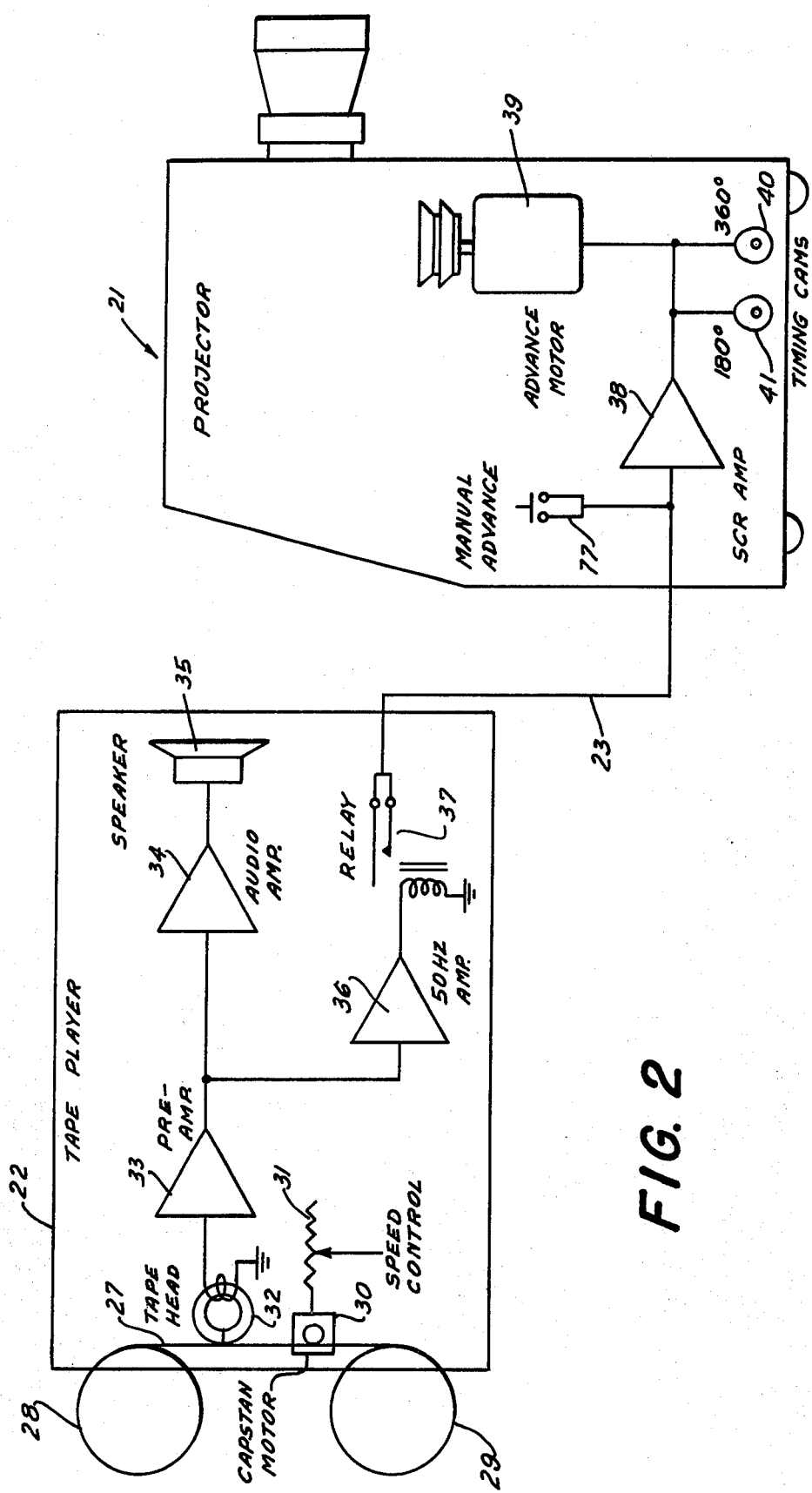
FIG. 2 is a block diagram of the circuitry employed in the aural/visual system of the invention.

As shown in FIG. 2, the cassette tape 27 passes through tape player 22 as it is transferred from a feeder reel 28 to a take-up reel 29 within the cassette. Cassette 26 fits into tape player 22 in a conventional manner. The tape 27 is driven by a capstan motor 30 within the player which has a variable speed controller 31 connected thereto. In this manner, the speed of transmittal of the audio program through the tape player can be adjusted by merely adjusting the variable resistor 31 in connection with the capstan motor 30.

A tape head 32 in player 22 is in contact with tape 27 to pick up both the audio program from the tape and the signals for activation of the projector. The audio program is passed through a preamplifier 33 to an audio amplifier 34 and then is transmitted out of player 22 through a speaker 35. In contrast, the activation signals which are in a different range from conventional audio signals, for example, 50 hertz is amplified by a second amplifier 36 so that it operates relay 37 to transmit the amplified signal through line 23 into projector 21. In the projector the activation signal is then amplified by SCR amplifier 38 and passes to the advance motor 39 which operates the mechanism for advancing the visual program. A pair of timing cams 40 and 41 are positioned in line between amplifier 38 and motor 39 and are set at 180° and 360° so that advancement of the visual portion can be properly coordinated with respect to the audio program. As shown in FIG. 2, an exposure switch 77 can be actuated to permit manual advancement of the visual portion without the necessity of a 50 hertz signal from tape player 22.

Figure 5:
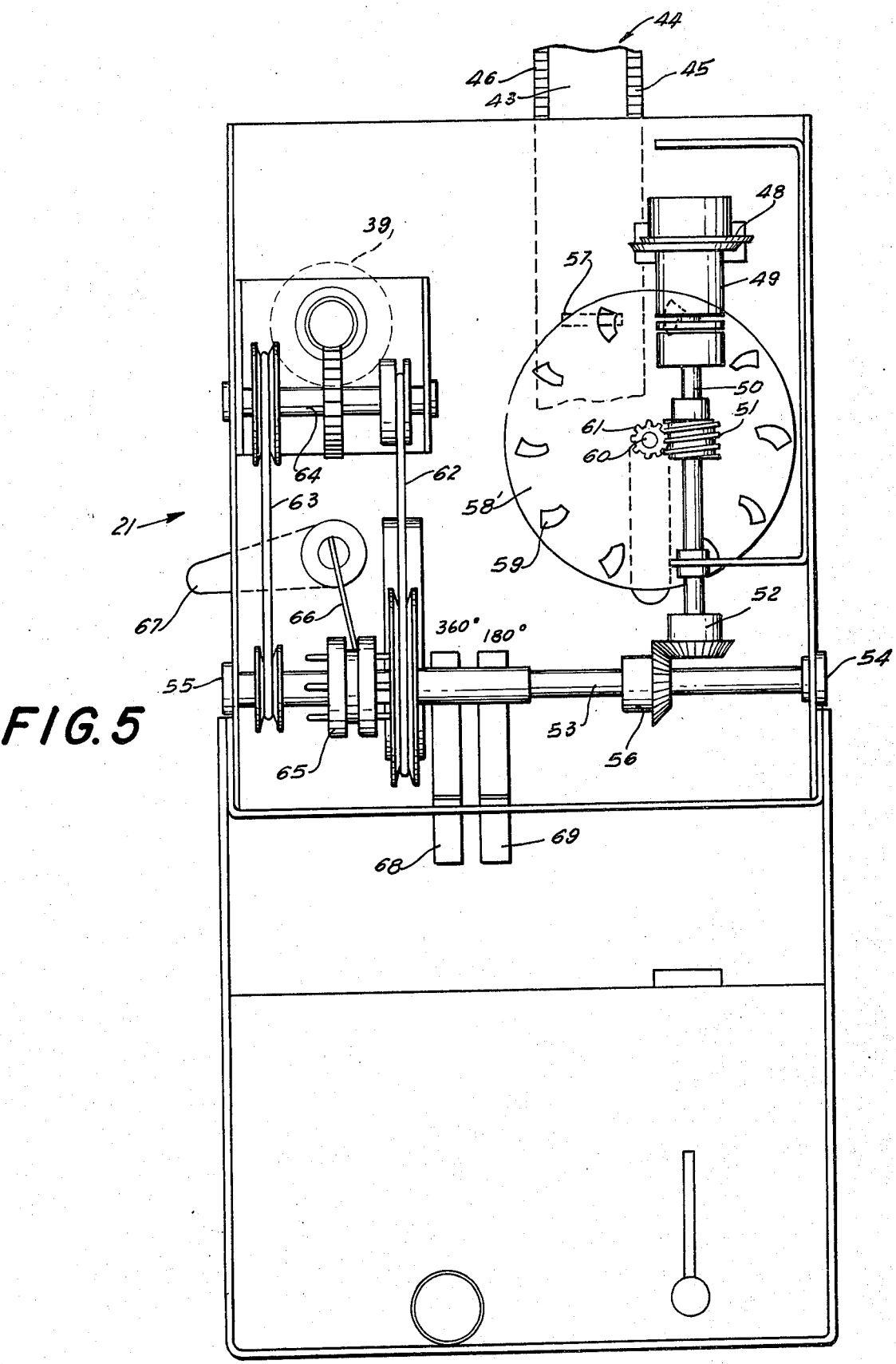
FIG. 5 is a front elevation view of the projector portion of the aural/visual system of the invention with the front cover having been removed.

The operational interior components of projector 21 are shown in detail in FIG. 5 of the drawings. The visual program is mounted on the central portion 43 of a slide stick 44. A rack of teeth 45 is positioned along at least one side of the stick 44 to engage with a pawl mechanism in the projector when the visual program is inserted therein. A separate rack of teeth 46 may be positioned on the other side of stick 44 to permit reversal of the stick and enable two separate visual program strips to be mounted on each stick 44 for use. As shown in FIG. 1, the stick 44 is inserted through an opening 47 in the top of the projector housing until the lower ratchet teeth come into engagement with a rotatable cam surface 48. The cam surface is a two-step cam to permit release of a single rack tooth upon rotation of the cam surface a predetermined amount of a complete revolution. The cam surface is affixed to a cam housing 49 which in turn is affixed to a rotatable cam shaft 50. Centrally located on cam shaft 50 below the cam housing 49 is a worm gear 51 and at the opposite end of shaft 50 from cam housing 49 is a bevel drive gear 52.

A rotatable projector drive shaft 53 is horizontally mounted in the projector so that it is journaled in fixed bearing member 54 at one end and an opposed fixed bearing member 55 at the other end. The bearing members 54 and 55 are mounted on the housing so that the interior openings therein to receive the shaft extend interiorly of projector 21.

A bevel gear 56 is horizontally mounted on projector drive shaft 53 so that its beveled surface engages with bevel gear 52 mounted on cam drive shaft 50.

In line with the viewing aperture 57 in the front of projector 21 which in turn is aligned with projector lens 58 on the exterior of the projector is the visual material portion 43 of slide stick 44. Positioned between aperture 57 and lens 58 is a rotating disc 58' with a plurality of openings 59 spaced about the circumference thereof. As disc 58' rotates, openings 59 come into alignment in sequence with aperture 57 and stick 43 at which time visual viewing surface 43 is exposed for viewing by the projector. A conventional lamp for illuminating the visual material on the stick so that it may be projected through aperture 57 and lens 58 onto a visual screen is not shown in the drawings but would be utilized in a conventional manner. Rotation of disc 58' passes an aperture 59 across aperture 57 thereby exposing a line of a visual program located on stick 44. Therefore, control of the rotation of disc 58' controls the exposure rate of a line of material on stick 44 and similarly, the rotation of discs 58' is coordinated with the rotation of cam surface 48 so that the visual program is coordinated with exposure of the various components thereof in a line-by-line sequence in the desired predetermined manner. Rotating disc 58' is mounted on a central rotating shaft 60 about which is mounted a disc control gear 61 which engages with worm gear 51 so that as cam drive shaft 50 is rotated disc 58' rotates along with cam surfaces 48. This action coordinates rotation of the disc 58' with exposure of the visual program on stick 44.

Drive motor 39 includes two separate belt assemblies 62 and 63 thereby providing a two-speed drive mechanism for projector shaft 53. The motor driven shaft 64 has one drive pulley of each of the drive assemblies 62 and 63 mounted thereon and projector shaft 53 has the other of the two drive pulleys of each of the assemblies 62 and 63 mounted thereon. An appropriate belt is mounted on the two drive pulleys of each drive assembly 62 and 63. A shiftable engaging claw 65 is keyed and slidably mounted on shaft 53 so that it can be shifted between engagement with either of the two drive assemblies 62 and 63 so as to drive projector shaft 53 at either of two speeds. A connector rod 66 is connected at one end to claw 65 and at the other end to a rotatable lever 67 which extends exteriorly and interiorly of projector 21 so that when the lever 67 is grasped and shifted between one of two positions it correspondingly shifts claw 65 into engagement with one of the two drive assemblies 62 and 63. In this manner, projector shaft 53 and cam shaft 50 and the remaining interconnected components within projector 21 can be driven at exposure rates in either a high or low speed range.

A further control on projector 21 is a tachistoscopic limit switch 68 on the interior of the projector which permits a stick 44 to be advanced manually downward two steps instead of one so that the first space is exposed very briefly and must be seen quickly before the second line is exposed for viewing.

An alternate tape limit switch 69 is located adjacent to the tachistoscopic switch 68 within the projector for use when it is desired to advance the stick downward one step or line of material at a time in response to audio signals. Both switches 68 and 69 are connected to an exterior knob control 70 which is a three-position control. Knob 70 can be positioned so that neither switchs 69 nor 68 are interconnected with the system, in particular in connection with projector drive shaft 53 and therefore operation of the components within the projector will serve merely to drive the visual program in a conventional manner to expose each individual line for a conventional visual program only. Shifting of knob 70 to the tape mode brings tape limit switch 69 into engagement with projector drive shaft 53 and interconnects the appropriate wiring required for permitting tape player 22 to run projector 21 in accordance with the audio program on a given cassette. Similarly shifting of switch 70 to the tachistoscopic position would disengage tape limit switch 69 and engage tachistoscopic limit switch 68 with shaft 53 and activate the appropriate wiring for operating the visual program in a tachistoscopic manner either manually by means of the exposure switch 77 or by means of audio signals as discussed above.

A rotatable elevation knob 71 is located on the exterior of the projector housing to elevate the projector in a conventional manner in cooperation with stand 72 so that lens 58 is properly positioned for viewing of the program at the desired location.

Additionally, a convenient stick lift lever 73 extends interiorly and exteriorly of the projector housing through elongated vertical slot 74. By shifting lever 73 upward within slot 74 the interior portion of lever 73 engages with the undersurface of stick 44 and pushes it upward so that it can be easily grasped and removed from the projector. This is useful since the visual program generally is located on the entire vertical surface of stick 44 and upon completion of the program the entire stick extends within the projector through slot 47.

The stick lift lever is L-shaped in configuration so that the inner portion forms a finger to engage stick 44 so that it can manually be lifted and grasped at the top of the projector for removal.

Other manual controls include a potentiometer knob 75 for regulation of the drive speed of drive motor 39 and is connected in a conventional manner to the drive motor mechanism interiorly of the projector housing. A hold button 76 is positioned on the exterior of the projector housing and is connected interiorly to a brake mechanism for engagement with the motor drive means to stop the motor at any given point and thereby hold the visual program at that point. A further manual control is an exposure button 77 which is connected interiorly of the projector in a conventional manner to manually advance and expose the visual program at any desired time. Naturally a conventional off-on switch would also be positioned on the projector to supply power to the projector. Similarly, a high-low lamp control button is provided in a conventional manner to adjust the light intensification for the visual program.

By moving an appropriate sliding mask (not shown) in front of aperture 57 up or down, various size openings can be positioned with respect to larger opening 57 so as to present one or more lines of material or part of a line.

Figure 3:
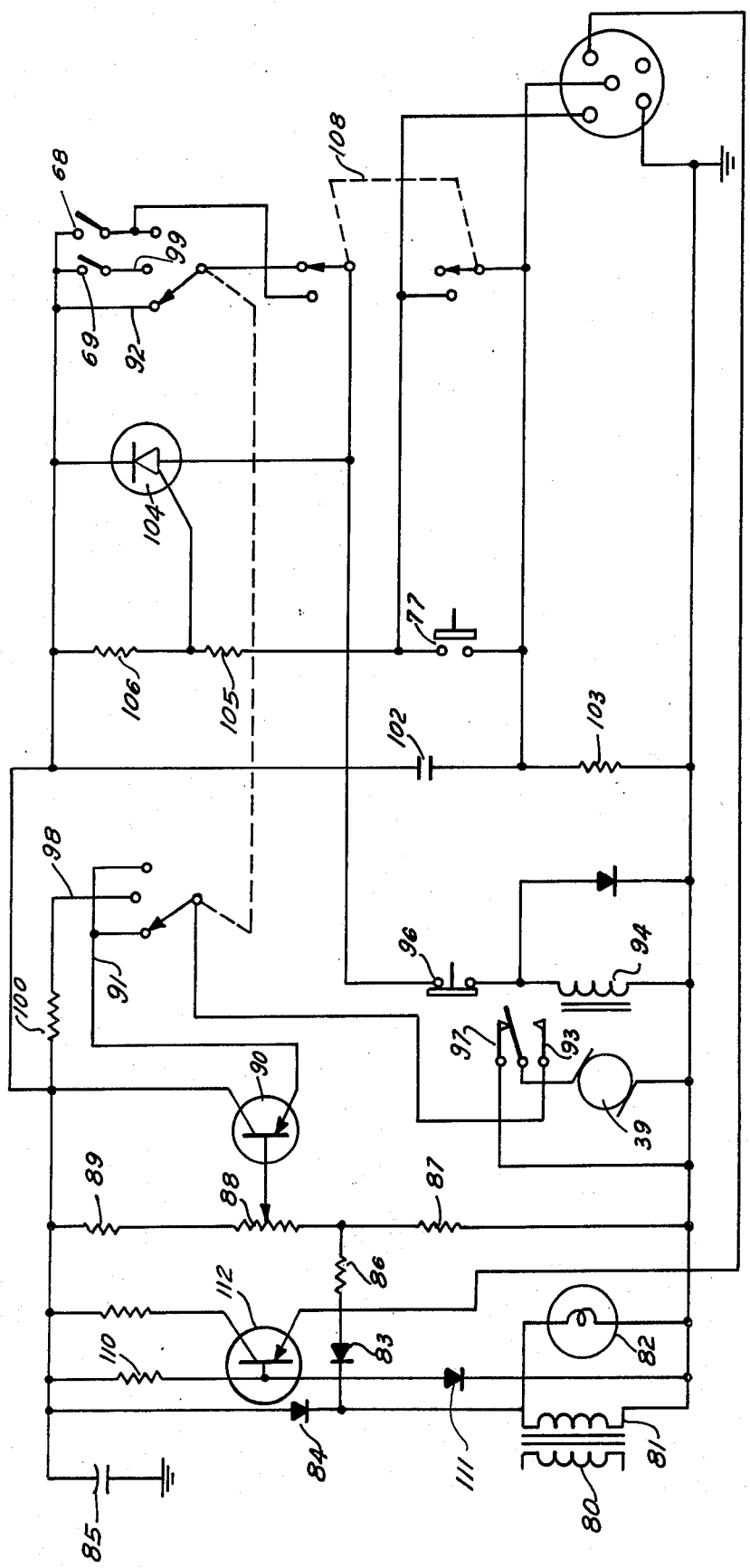
FIG. 3 is a schematic view of the circuitry employed in the projector portion of the aural/visual system of the invention.

The circuitry in detail employed within the projector for operation of the mechanism therein is shown in schematic form in FIG. 3.

The primary projector circuitry is depicted in FIG. 3 of the drawings and operates substantially as follows. When power is applied to the transformer primary 80, the secondary 81 supplies eighteen volts at six amps to the 80 watt projection lamp 82. One end of the secondary winding goes to the cathodes of two diodes 83 and 84. Diode 84 connects to a 1000uf, 50 volt capacitor 85 and causes it to charge to approximately minus 23 volts. Diode 83 connects to a 680 ohm resistor 86 and a 68 ohm resistor 87. This network provides a negative half-wave rectification with about one-tenth of the peak transformer voltage appearing at the lower end of a 2.5k potentiometer 88. The top of potentiometer 88 is connected to a 100 ohm 2 watt resistor 89 which goes to the minus 23 volt supply 85. The center of the potentiometer goes to the base of a 2N2869 transistor 90 which is used as an emitter follower to supply variable motor voltage which is determined by the setting of potentiometer 88. The slower the motor is run, the greater is the ripple that the motor receives. This ripple provides greater slow speed torque than a steady D.C. voltage.

With the mode switch in the "READ" position, as shown, contacts 91 and 92 are connected. Contact 91 provides variable motor voltage to the N.O. relay contact 93. Contact 92 provides relay coil voltage which pulls in the relay 94 and provides voltage to motor 39. If the "HOLD" button 76 is pushed, relay 94 drops out and the motor is braked by the N.C. relay contacts 97.

With the mode switch in the "TAPE" position, that is connected at contact points 98 and 99, contact 98 provides fixed motor voltage from a 20 ohm-5 watt resistor 100 (which limits motor acceleration) to the N.O. relay contact 93. When either the exposure button 77 is pressed or the tape player transistor switch 130 closes, the 0.1uf capacitor 102, which is charged by the 220K resistor 103, is discharged into the gate of C106B1 transistor 104 through the 2.2K and 1K resistors 105 and 106 respectively, causing trasistor 104 to latch on and provide relay coil voltage. Relay 94 pulls in and motor 39 runs until the 180° cam or limit switch 69 on contact 99 closes and opens. During the time the cam switch is closed, transistor 104 current is bypassed through the cam switch which causes transistor 104 to unlatch. When the cam switch opens, the relay drops out and motor 39 is braked.

Before the plastic stick is inserted for the tape or tach mode, the "SYNC" button 108 must be pressed to insure that the 360° cam is in the proper position for synchronization. When this button is depressed, it connects the 360° cam through switch 68 and pulses transistor 104. Motor 39 runs until the cam opens. Now the unit is in synchronization for tape or tach modes.

A 1.5K resistor 110 and a 6 volt zener diode 111 provide base voltage on a 2N2869 transistor 112 which is used to power an external 6 volt tape player.

The depicted circuitry is merely exemplary of many variations which conventionally may be employed to accomplish the same results.

The speed of the visual presentation can be controlled independently by manual controls on the projector when switch 70 is in the read or tachistoscopic positions. When switch 70 is in the tape position, speed control of the visual program is regulated by tape player 22. The circuit arrangement within tape player 22 which is responsive to audio signals from cartridge 26 or alternatiely from manual controls on tape player 22 to control the speed of the visual program presented in projector 21 is illustrated in schematic form in FIG. 4. In general, the circuitry of FIG. 4 illustrates the operative electronics of tape player 22 and its coordination with projector 21 in controlling the visual presentation rate in respect to the audio presentation rate.

The projector is synchronized with a magnetic tape recorder by recording on the magnetic tape a signal that can be detected and utilized to control the slide projector. The system depicted in FIGS. 4 and FIG. 4a is one method by which this control may be accomplished. FIG. 4 shows the circuitry in schematic form and FIG. 4a shows the circuitry in block form. Naturally, other expedient circuit arrangements which are well known in the art can be employed in substitution for the circuitry depicted and described below.

In the system shown, in order to obtain the required filtering, a series of cascaded band pass filter amplifiers are utilized. Operational amplifiers permit building active filters at sufficiently high impedance levels to reduce the component size to a practical level.

The three operational amplifiers are all part of a single integrated circuit 124. The first and second sections, 125 and 126, are band pass filter amplifiers. The third section 127 is a rectifier filter combination. This circuit receives the amplifier cue signal and converts it into a D.C. signal. The output of section 127 drives a 2N697 transistor 128 which in turn operates an optical coupler 129. This in turn switches a transistor through transistor switch 130 which is in series with projector motor 39.

Turning to the actual circuitry as depicted in FIG. 4, section 125 is an inverting operational amplifier with a two pole low pass filter in its input. This filter consists of 10K resistor 132 and 0.3 ufd capacitor 133 and 10K resistor 134 and 0.3 ufd capacitor 135. An additional pole is created by 1 Meg resistor 136 and 4700 pf capacitor 137, the feedback resistor and capacitor. 1.5 ufd capacitor 138 is a coupling capacitor to isolate the amplifier from the tape head in the recorder. 2 Meg resistor 139 provides the required biased current to the amplifier. The output of section 125 appears at pin 140. This is coupled capacitively through 0.33 ufd capacitor 141 to the input 100K resistor 142 of amplifier 126. Resistor 142 and 0.01 ufd capacitor 143 provide a low pass filter at the input of this amplifier. 1 Meg resistor 144 and 330 pf capacitor 145 in the feedbck circuit of amplifier 126 provide an additional low pass element. Again, 2 Meg resistor 146 is provided to supply the necessary bias current.

The amplified output of section 126 appears at pin 147 and is capacitively coupled through 0.33 ufd capacitor 148 to the rectifier diode 149. Diode 149 rectifies the A.C. voltage and supplies it as D.C. to the filter 0.15 ufd capacitor 150. The voltage developed across capacitor 150 is applied through 100K resistor 151 to amplifier 127. 0.01 ufd capacitor 152 and 1 Meg resistor 153 provide additional filtering for the D.C. voltage. Again, 2 Meg resistor 154 and 2 Meg resistor 155 provide the necessary bias currents to this amplifier. The output of section 127 is a direct current appearing at pin 156 and is due to the alternating current obtained at the output of the previous amplifier. When the output of section 127 is sufficient to overcome the breakdown voltage of the zener diode 157, current flows through diode 157 and 2.2K resistor 158 into the base of transistor 128. Base current at transistor 128 creates a collector current through the light emitting diode of the optical coupler 129. 47K resistor 159 at the base of the transistor 128 provides the necessary leakage bypass when the transistor is in the off state. The light created by energizing the diode of the optical coupler, couples to a transistor and creates a collector to emitter current in the optical coupler's output transistor. This transistor is utilized in the Darlington connection with a controlled transistor to increase the gain of the control transistor which acts as the control transistor to start and stop projector motor 39.

200 ohm resistor 160 is connected to coupler 129.

A common well known type of variation rheostat system in the tape motor or other known motor speed rgulation means that changes the mode of speed is also acceptable for teaching purposes despite frequency change in the narrator's voice. The presentation speed can be varied by use of speed control 31 in the tape player.

In operation, in the depicted embodiment the tape player and projector are connected to power sources. Switch 70 is switched to the tape mode which engages switch 69 with projector drive shaft 53.

A slide stick 44 containing the visual program in line-by-line sequence is positioned in slot 47 until its bottom edge engages with the cam surfaces 48. A cartridge 26 having an audio program in addition to activation signals is positioned in tape player 22. Control panel 78 is then properly activated for operation. Motor 30 drives tape 27 at the desired rate of speed with the assistance of a speed controller 31. Tape head 32 picks up the audio program and wheen an appropriate 50 hertz signal is received, drive motor 39 drives interconnected shafts 53 and 50 to rotate cam surface 48 and drop slide stick to the next succeeding visual line. The operation is repeated as each individual 50 hertz signal is received. It has been found that a successful tape advance pulse is one of 50 hertz input for 0.3 seconds When it is desired to use the audio program to present tachistoscopic exposure or to increase or decrease the rate of change of visual presentation, the mode of switch 70 would be set on tach position, the speed lever 67 would be shifted to the higher speed range, and the reading rate dial 75 rotates to increase or decrease the motor speed thereby correspondingly affecting the rate of rotation of the cam surface and presentation of the sequence of material on slide 44.

When it is desired to present tachistoscopic exposures manually, mode switch 70 is moved to the tach position and actuation of the visual program is accomplished by depressing exposure switch 77.

When it is desired to operate the visual program independent of the audio program, switch 70 is moved to the read position. At this point a manual speed lever 67 can be shifted between each of two positions to change the motor speed depending on whether it is desirable to expose the material at a slow or fast pace. Generally, in the reading mode switch 67 and the interconnected structure is shifted to the low speed position and for the tachistoscopic and the tape mode the switch 67 and interconnected structure is switched to the high speed position.

When the program is completed, the projector and tape player are turned off and lever 73 is moved upwardly exposing the top of slide 44 for grasping and removal from the projector.

It can be readily seen that by controlling the sequence of visual presentation in relation to an aural presentation at a predetermined controlled rate while maintaining coordination between the programs and slightly out of phase on a cassette can provide a teaching facility for use as described above in learning environments.

Thus the several aforenote objects and advantages are most effectively attained. Although several somewhat preferred embodiments hve been disclosed and described in detail herein, it should be understood that this invention is in no sense limited thereby and its scope is to be determined by that of the appended claims.

What is claimed is:

1. A method of aural and visual correspondence for the improvement of reading by training the reader comprising:

viewing a visual program in line-by-line sequence with the print being stationary and a single line being observable during the predetermined viewing time;

transmitting an aural program in the form corresponding to the visual program and including signals to advance the visual program with a single pulse in a predetermined pattern in coordination with the audio program; and presenting the aural and visual programs slightly out of time sequence one to the other while still maintaining a line of visual material in coordination with the audio program so that the rate of both aural and visual presentation are constant one to the other.

2. The invention in accordance with claim 1 wherein the sequence of presentation of the visual program is offset in time with respect to the sequence of transmission of the aural program while retaining constant rate of presentation of both the aural and visual programs by providing an adjustable variable speed drive motor for changing the viewing rate of the visual program.

3. The invention in accordance with claim 1 wherein the coordinated presentation of the visual and aural programs is varied by use of an adjustable variable speed tape drive means.

4. The invention in accordance with claim 1 wherein the sequential presentation of the visual and aural programs is varied by providing means for rapidly advancing more than one line of the line-by-line sequence at a time so as to permit tachistoscopic viewing of the program.

5. Apparatus for aural and visual correspondence for the improvement of reading by training the reader comprising:

a visual program in line-by-line sequence with each line being held in position during a predetermined viewing time and a single line being observable during the predetermined viewing time;

means for holding the visual program, advancing and exposing the program in line-by-line sequence in response to a predetermined signal;

an aural program corresponding to the visual program and including spaced signals thereon for advancing the visual program with a single pulse;

means for holding, advancing and transmitting the aural program at a predetermined rate so that the signals thereon advance the visual program in line-by-line sequence in correspondece with the aural program and at constant rate with respect thereto; and means to vary the sequence of presentation of the audio and visual programs with respect to one another including the ability to present the audio and visual programs slightly out of time sequence while still maintaining a line of visual material in combination with the audio program and maintaining the constant rate of presentation and coordination of the audio and visual program presentation.

* * * * *